US012043052B2

(12) United States Patent
Labelle et al.

(10) Patent No.: US 12,043,052 B2
(45) Date of Patent: *Jul. 23, 2024

(54) SYSTEMS AND METHODS FOR IMPROVED INK RECEPTIVE SUBSTRATE

(71) Applicant: Brady Worldwide, Inc., Milwaukee, WI (US)

(72) Inventors: Michael D. Labelle, Hubertus, WI (US); Harry Miesner, New Smyrna Beach, FL (US); Alexis M. Landfried, Milwaukee, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,813

(22) Filed: Jan. 20, 2023

(65) Prior Publication Data

US 2023/0150289 A1 May 18, 2023

Related U.S. Application Data

(63) Continuation of application No. 17/600,560, filed as application No. PCT/US2020/023694 on Mar. 19, 2020, now Pat. No. 11,590,789.

(Continued)

(51) Int. Cl.
*B41M 5/50* (2006.01)
*B41M 5/52* (2006.01)

(52) U.S. Cl.
CPC .......... *B41M 5/5218* (2013.01); *B41M 5/508* (2013.01); *B41M 5/5254* (2013.01); *B41M 5/5263* (2013.01); *B41M 5/5227* (2013.01)

(58) Field of Classification Search
CPC .. B41M 5/5218; B41M 5/508; B41M 5/5254; B41M 5/5263; B41M 5/5227

(Continued)

(56) References Cited

U.S. PATENT DOCUMENTS 4,889,765 A * 12/1989 Wallace .................. C08L 77/12 442/72
4,926,109 A * 5/1990 Koterasawa .............. G05F 1/56 323/273

(Continued)

FOREIGN PATENT DOCUMENTS

| | | | |
|---|---|---|---|
| JP | H11227316 A | 8/1999 |
| WO | 2018057851 A1 | 3/2018 |

OTHER PUBLICATIONS

Fu et al., Polymer Mixing Enhances Performance, European Coatings Journal, Jun. 1, 2009, 5 pages.

(Continued)

*Primary Examiner* — Betelhem Shewareged
(74) *Attorney, Agent, or Firm* — Quarles & Brady LLP

(57) ABSTRACT

An ink receptive substrate including an ink receptive layer configured to receive at least one inkjet ink. The ink receptive layer having a plurality of first silica particles and a plurality of second silica particles, wherein the average particle diameter of the first silica particles is different than the average particle diameter of the second silica particles. The ink receptive layer also having a first acrylic polymer and a second acrylic polymer, wherein the first acrylic polymer and second acrylic polymer are partially miscible. In one aspect, the includes ink receptive substrate includes a base layer configured to support the ink receptive layer and a high water capacity layer configured to reduce water accumulation in the ink receptive layer.

22 Claims, 13 Drawing Sheets

Related U.S. Application Data

(60) Provisional application No. 62/827,385, filed on Apr. 1, 2019.

(58) Field of Classification Search
USPC ........................................................ 428/32.35
See application file for complete search history.

(56) References Cited

U.S. PATENT DOCUMENTS

| | | | | |
|---|---|---|---|---|
| 6,893,690 | B2 * | 5/2005 | Yamamoto | B41M 5/52 428/32.28 |
| 8,003,176 | B2 | 8/2011 | Ylitalo et al. | |
| 9,840,104 | B2 | 12/2017 | Rueckert et al. | |
| 11,597,852 | B2 * | 3/2023 | Li | C08K 5/14 |
| 2002/0011191 | A1 * | 1/2002 | Greenwood | C04B 12/04 106/737 |
| 2003/0076395 | A1 * | 4/2003 | Onishi | B41M 7/0027 347/101 |
| 2003/0180541 | A1 | 9/2003 | Naik et al. | |
| 2006/0210729 | A1 * | 9/2006 | Taka | B41M 5/502 428/32.1 |
| 2008/0057230 | A1 * | 3/2008 | Read | B41M 5/5218 428/32.6 |
| 2008/0057231 | A1 | 3/2008 | Li et al. | |
| 2011/0032304 | A1 | 2/2011 | Mozel et al. | |
| 2016/0251507 | A1 * | 9/2016 | Zhang | C08L 43/04 428/220 |
| 2018/0251655 | A1 | 9/2018 | Patil et al. | |
| 2022/0169063 | A1 | 6/2022 | Labelle et al. | |

OTHER PUBLICATIONS

Grace Company, SYLOID(R) C 812 Matting Agent, Product Information, https://www.ulprospector.com/en/na/Coatings/Detail/304/16714/SYLOID-C-812-Matting-Agent, 2022, 2 pages.
Lubrizol Corporation, PrintRite DP339 Ink Receptive Coating, https://www.lubrizol.com/en/Coatings/Products/PrintRite-DP-339, Copyright 2022 The Lubrizol Corporation, 1 page.
PPG Industries, PPG Silica Products, Lo-Vel Flatting Agents, Non-Treated, Product Data, Copyright 2011 PPG Industries, Inc., 2 pages.
European Patent Office, Extended Search Report, Application No. 20781808.9, Dec. 8, 2022, 8 pages.
PCT International Search Report and Written Opinion, PCT/US2020/023694, Jun. 10, 2020, 13 pages.

* cited by examiner

SYSTEMS AND METHODS FOR IMPROVED INK RECEPTIVE SUBSTRATE

CROSS-REFERENCE TO RELATED APPLICATIONS

This application is a continuation application of U.S. patent application Ser. No. 17/600,560 filed Sep. 30, 2021 which represented the U.S. national stage entry of International Application No. PCT/US2020/023694 filed Mar. 19, 2020, which claims the benefit of U.S. Provisional Application No. 62/827,385 entitled "Systems and Methods for Improved Ink Receptive Substrate" filed on Apr. 1, 2019, which are incorporated by reference herein for all purposes.

STATEMENT OF FEDERALLY SPONSORED RESEARCH OR DEVELOPMENT

Not applicable.

BACKGROUND

In many industries, traditional inkjet labels are falling short of achieving the necessary level of outdoor durability when it comes to ultraviolet light stability and exposure to water. As a result, many companies require wide format inkjet printers with special latex and/or ultraviolet inks and heating/curing systems, or default to thermal transfer (THT) printers that struggle to produce durable color prints with a wide color gamut.

Initially, label manufacturers responded to this trend by offering over-laminates and clear coat lacquers which act as an optically clear protective barrier which is adhered or coated over the inkjet printed label, thereby offering increased UV stability and decreasing the labels exposure to water. However, over-laminates are difficult to use, involve a secondary step, and require additional sourced over-laminate materials. Alternatively, many label manufacturers resorted to labels that offered limited durability by recommending restricted exposure to either or both ultraviolet light and water.

Unfortunately, most industries currently utilize inkjet printed labels that do not withstand outdoor exposure and require continual monitoring and replacing over time. Some industries utilize durable color printed labels that are printed using the traditional THT printed method, or utilize expensive printing systems that require a heating/curing system. As a result, the reception to outdoor durable inkjet printed labels has been mixed.

SUMMARY

In view of the above, there is a need for the development of an outdoor durable, full color inkjet receptive white label that can be printed on demand without the use of specialty printing systems requiring a heating or curing system.

The present disclosure addresses the aforementioned issues by providing an ink receptive substrate with improved outdoor durability. The unique composition of the ink receptive substrate contains several features that are believed to be novel and allow for its improved characteristics. The inkjet receptive substrate can utilize the unique properties of silica fillers of varying particle size, partially miscible resin selection, solid UV absorbers, nonwoven anchoring substrates, and an induced surface topography to achieve its durability advancements. Consequently, when compared to prior inkjet printing labels and substrates, the ink receptive substrate of the present disclosure is capable of achieving improved ultraviolet light durability, chemical resistance, abrasion resistance, and water resistance.

According to one aspect, the present disclosure provides an ink receptive substrate comprising an ink receptive layer configured to receive at least one inkjet ink. The ink receptive layer includes a plurality of first silica particles and a plurality of second silica particles, wherein the average particle diameter of the first silica particles is different than the average particle diameter of the second silica particles. The ink receptive layer also includes a first acrylic polymer and a second acrylic polymer, wherein the first acrylic polymer and second acrylic polymer are partially miscible.

In some forms of the ink receptive substrate, the average particle diameter of the first silica particles may differ from that of the second silica particles by at least 2 micrometers. Still further, in some forms, the average particle diameter of the first silica particles may differ from that of the second silica particles by at least 4 micrometers.

In some forms, the average particle diameter of the first silica particles may be between 10 and 14 micrometers.

In some forms, the average particle diameter of the second silica particles may be between 6 and 10 micrometers.

In some forms, the ink receptive layer may further include one or more ultraviolet light absorbers. The ultraviolet light absorber(s) may be in the form of a solid.

In some forms, the ink receptive substrate may further include a base layer configured to support the ink receptive layer. The base layer may be a nonwoven fabric. A portion of the base layer may be positioned to contact at least a portion of the ink receptive layer. Still further, the ink receptive substrate may further include a high water capacity layer configured to reduce water accumulation in the ink receptive layer, in which at least a portion of the high water capacity layer is interposed between the ink receptive layer and the base layer.

In some forms, the ink receptive layer may have a thickness between 0.2 and 3.0 mils.

According to another aspect, the present disclosure provides an ink receptive substrate comprising an ink receptive layer configured to receive at least one inkjet ink. The ink receptive layer comprising a plurality of first silica particles and a plurality of second silica particles, wherein the average particle diameter of the first silica particles is different than the average particle diameter of the second silica particles.

In some forms, the average particle diameter of the first silica particles may differ from that of the second silica particles by at least 2 micrometers. In other forms, the average particle diameter of the first silica particles may differ from that of the second silica particles by at least 4 micrometers.

In some forms, the average particle diameter of the first silica particles may be between 10 and 14 micrometers.

In some forms, the average particle diameter of the second silica particles may be between 6 and 10 micrometers.

In some forms, the average surface area of the first silica particles may be at least 30% more than the average surface area of the second silica particles.

In some forms, the mass ratio of the first silica particles to the second silica particles in the ink receptive substrate may be between about 9:1 and 1:9.

In some forms, the ink receptive layer may further include one or more ultraviolet light absorber. The ultraviolet light absorber(s) may be in the form of a solid.

In some forms, the ink receptive substrate may further include a base layer configured to support the ink receptive layer. The base layer may be a nonwoven fabric. A portion of the base layer may be positioned to contact at least a portion of the ink receptive layer. The ink receptive substrate of may further include a high water capacity layer configured to reduce water accumulation in the ink receptive layer, in which at least a portion of the high water capacity layer is interposed between the ink receptive layer and the base layer.

In some forms, the ink receptive layer may have a thickness between 0.2 and 3.0 mils.

According to yet another aspect, the present disclosure provides an ink receptive substrate comprising an ink receptive layer configured to receive at least one inkjet ink. The ink receptive layer comprising a first acrylic polymer and a second acrylic polymer, wherein the first acrylic polymer and second acrylic polymer are partially miscible.

In some forms, the hardness of the ink receptive substrate may increase with increasing concentration of the first acrylic polymer. The flexibility of the ink receptive substrate may increase with increasing concentration of the second acrylic polymer. The mass ratio of the first acrylic polymer to the second acrylic polymer may be between 1:3 and 1:9.

In some forms, the weighted average of the glass transition temperatures of the first acrylic polymer and the second acrylic polymer may be between −14 and 42 degrees Celsius. More narrowly, the weighted average of the glass transition temperatures of the first acrylic polymer and the second acrylic polymer may be between 5 and 10 degrees Celsius.

In some forms, the ink receptive layer may further include one or more ultraviolet light absorber. The ultraviolet light absorber(s) may be in the form of a solid.

In some forms, the ink receptive substrate may further include a base layer configured to support the ink receptive layer. The base layer may be a nonwoven fabric. A portion of the base layer may be positioned to contact at least a portion of the ink receptive layer. The ink receptive substrate may further include a high water capacity layer configured to reduce water accumulation in the ink receptive layer, in which at least a portion of the high water capacity layer is interposed between the ink receptive layer and the base layer.

In some forms, the ink receptive layer may have a thickness between 0.2 and 3.0 mils.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1:
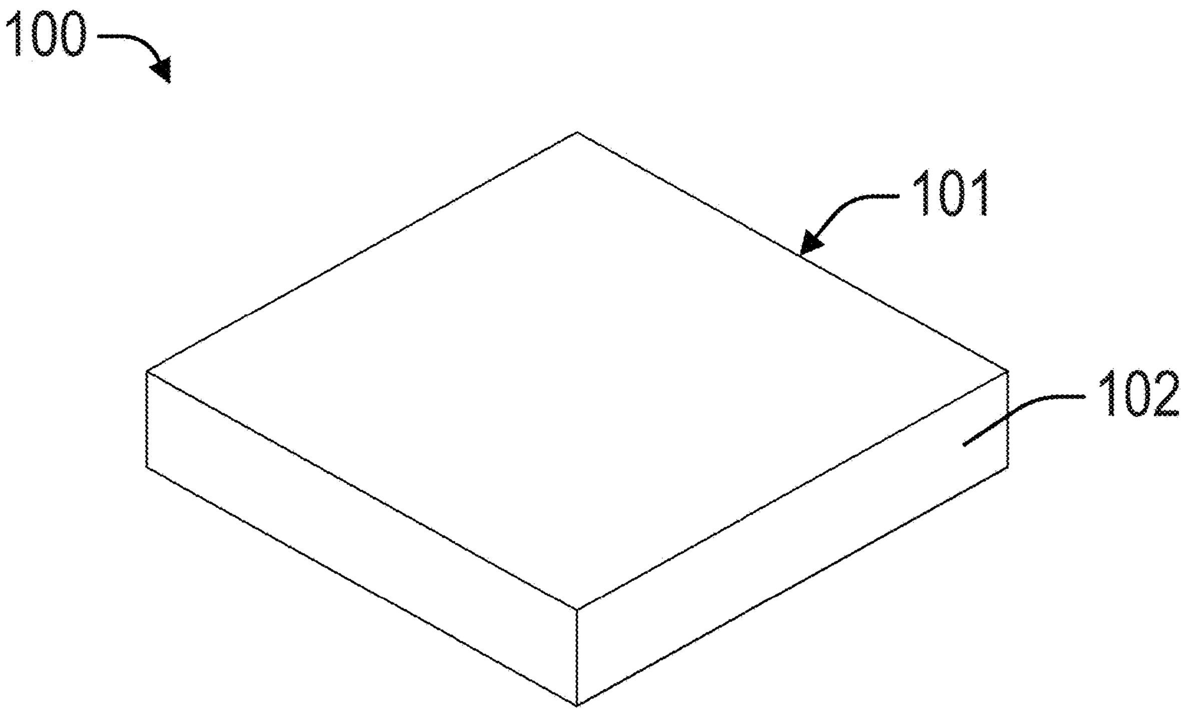
FIG. 1 is a perspective view of a portion of an ink receptive substrate, in accordance with one aspect of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted", "connected", "supported", and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, a "binder" refers to a polymeric material of varying composition that holds a filler or pigment within a matrix.

As used herein, "partially miscible" may refer to a pair of partially miscible solutions that mix under some conditions but not at others. The solutions may be organic. A partially miscible solution may mix under agitation, but separate over time when left stagnant.

The present disclosure relates to an ink receptive substrate with improved environmental durability. As will be described below, the unique composition of the ink receptive substrate results in a durable construction suitable for a wide variety of printing applications, such as labels that are exposed to outdoor conditions.

Although the present ink receptive substrate is commonly described as receiving inkjet inks, one of skill in the art may recognize that the system and methods described herein can be applied to various printing applications.

FIG. 1 depicts an ink receptive substrate 100 according to one aspect of the present disclosure. In the illustrated embodiment, the ink receptive substrate 100 includes an ink receptive layer 102 configured to receive at least one inkjet ink. The ink receptive layer has a top surface 101 onto which inkjet ink may be deposited and become visible to a user. As will be further discussed, the unique composition of the ink receptive layer 102 allows the inkjet inks deposited on the top surface 101 to withstand harsh environmental conditions without significant weathering, relative to prior inkjet receptive systems.

The ink receptive layer 102 may comprise a plurality of first silica particles and a plurality of second silica particles. The average particle diameter of the first silica particles may be different than the average particle diameter of the second silica particles for example, with a generally bimodal distribution of particle diameters. Such a size difference allows the ink receptive layer 102 to exhibit unique ink absorption and water management properties. For instance, the first silica particles may also be referred to as the absorptive filler particles, and be particularly suited for absorbing ink. The second silica particles may also be referred to as the packing silica particles, and be particularly suited for prohibiting the flow of liquids through the ink receptive layer.

Figure 4A:
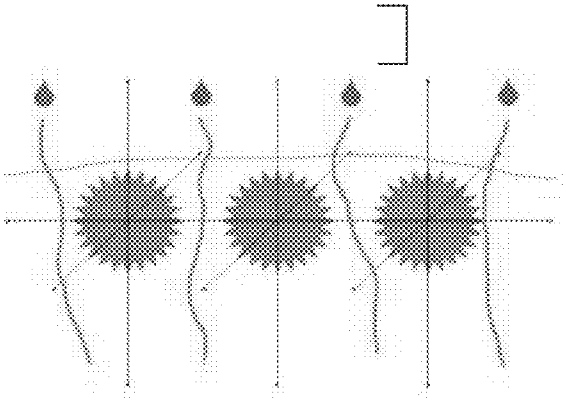
FIG. 4A depicts a schematic representation of fluid transfer in a plurality of first silica particles having a first diameter.
Figure 4B:
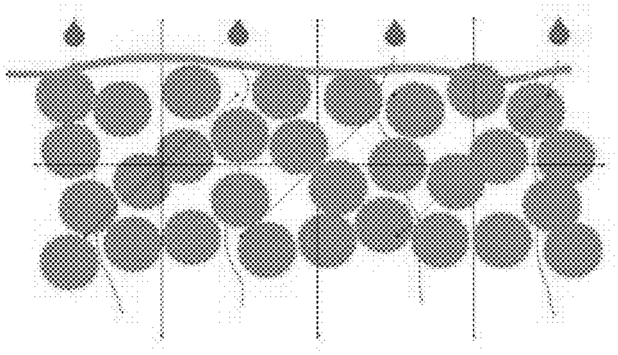
FIG. 4B depicts a schematic representation of fluid transfer in a plurality of second silica particles having a second diameter smaller than the first diameter.
Figure 4C:
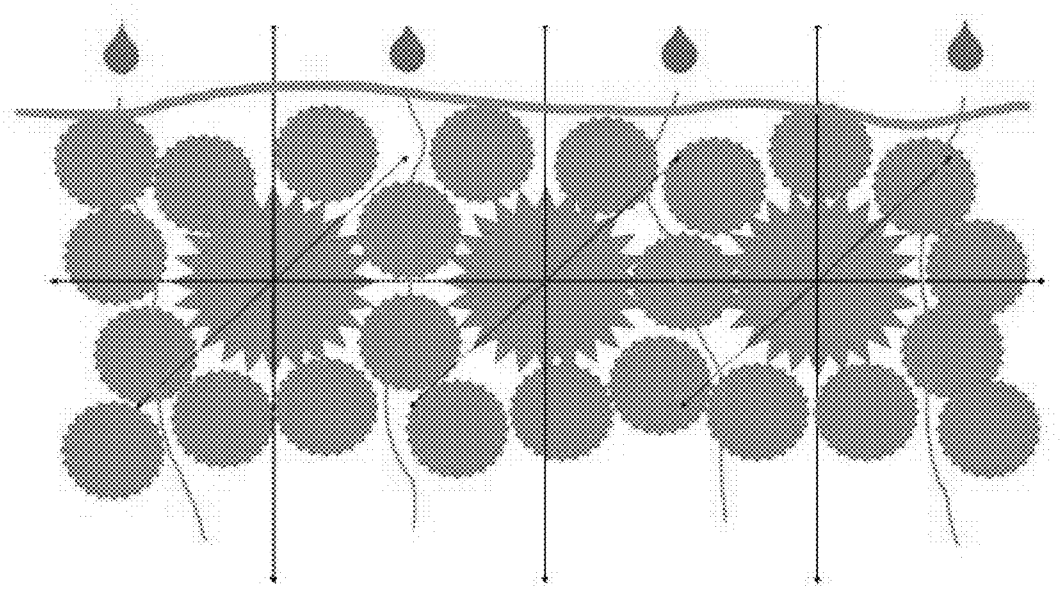
FIG. 4C depicts a schematic representation of fluid transfer in a mixture of the plurality of first silica particles and the plurality of second silica particles.

As shown in FIGS. 4A-4C, the first silica particles (FIG. 4A) may have a larger average diameter than the second silica particles (FIG. 4B). The specific size of the first and second silica particles and the size difference between the two groups may be important to achieving favorable printing quality and weathering resistance in the ink receptive substrate.

As some examples, the first silica particles may have an average particle diameter of about 6 micrometers, about 8 micrometers, about 10 micrometers, about 11 micrometers, about 12 micrometers, about 13 micrometers, about 14 micrometers, about 16 micrometers, about 18 micrometers, about 20 micrometers, between about 6 micrometers and 20 micrometers, or between about 10 and 14 micrometers. The second silica particles may have an average particle diameter of about 6 micrometers, about 7 micrometers, about 8 micrometers, about 9 micrometers, about 10 micrometers, about 11 micrometers, about 12 micrometers, about 13 micrometers, between about 6 micrometers and 13 micrometers, or between about 6 and 10 micrometers. The difference in average particle diameter between the first silica particles and the second silica particles may be at least about 1 micrometers, about 2 micrometers, about 3 micrometers, about 4 micrometers, about 5 micrometers, or about 6 micrometers.

The first and second silica particles may have a generally uniform size distribution. For instance, the particles of the first and second silica particle groupings may generally have particle diameter range within about 1.5 micrometers, about 1 micrometer, or about 0.5 micrometer from the average particle diameter. In addition to a difference in size, the first silica particles may differ from the second silica particles by geometric shape, porosity, composition, surface area, absorptive capacity, or combinations thereof. Still yet, the first grouping of silica particles may have an average diameter and range that does not overlap with the average diameter and range of the second group and there may be a gap between the top of one of the ranges and the bottom of the other range in which no particles of either group is found, with that gap being, for example about 1 micrometers, about 2 micrometers, about 3 micrometers, about 4 micrometers, about 5 micrometers, or about 6 micrometers.

In one form, the first and second silica particles may comprise silicon dioxide, consist essentially of silicon dioxide, or consist of silicon dioxide. The first and second silica particles may specifically be non-coated and non-treated silica. The first and second silica particles may be homogenously mixed in the ink receptive layer 102. The mass ratio of the first silica particles to the second silica particles in the ink receptive substrate may be about 9:1, about 5:1, about 2:1, about 1:1, about 1:2, about 1:5, about 1:9, or between about 9:1 and 1:9. The ink receptive layer may comprise additional additives such as stabilizers, anti-oxidants, dye mordants, mold inhibitors, or combinations thereof.

The surface area of the silica particles helps determine the degree of interaction and absorption between the particles and ink or water. The first silica particles may have a surface area of between about 300 and 2000 $m^2/g$, between about 300 and 10000 $m^2/g$, or specifically between about 300 and 400 $m^2/g$. The second silica particles may have a surface area of between about 150 and 750 $m^2/g$, between about 170 and 500 $m^2/g$, or between 170 and 300 $m^2/g$. The difference in surface area between the first silica particles and the second silica particles may be at least about 50 $m^2/g$, about 75 $m^2/g$, about 100 $m^2/g$, about 150 $m^2/g$, about 200 $m^2/g$, or about 300 $m^2/g$. The average surface area of the first silica particles may be more than the average surface area of the second silica particles by at least about 10%, about 20%, about 30%, about 40%, or about 50%.

As can be seen in FIG. 4A, in a single silica system which utilizes large diameter silica, the silica may generally be more absorptive but can also create channels in which water can travel unhindered. These channels carry some of the ink solids through the coating, resulting in lower optical density. As can be seen in FIG. 4B, in a single silica system which utilizes a high packing efficiency, smaller diameter silica, the silica creates a tightly packed system which inhibits the water and ink from freely traveling through the pores, thereby resulting in an increased optical density. However, the smaller diameter silica particles have smaller surface areas, pore volumes, and surface roughness, which can lead to reduced water capacity and a smaller number of peaks and valleys on the top surface 101.

FIG. 4C depicts a dual particle system consistent with at least some aspects of the present disclosure. As can be seen in the depiction, this unique combination of varying silica sizes provides an increased packing efficiency around a highly absorptive silica, thereby acting as a mechanical sieve that filters the water towards the bottom while depositing the solids (i.e. resin and pigment) towards the surface.

As an alternative or in addition to the silica particles, the ink receptive substrate 100 may comprise a first acrylic polymer and a second acrylic polymer, wherein the first acrylic polymer and second acrylic polymer are partially miscible. Using such a partially miscible resin blend as the binder allows the resulting ink receptive layer 102 to have improved performance attributes that are drawn from the individual properties of each of the polymers.

Unlike previous systems that use resins such as aqueous polyester, polyether, polyether-polyurethane, polyester-polyurethane, or components of the like, the present resin blend may use two grades of acrylic resins that are partially miscible. By using two partially miscible resins, the ink receptive layer can be engineered to exhibit specific physical properties. The physical properties may be influenced by the interaction and arrangement of each resin, allowing for properties such as flexibility, swell-ability, hardness, and durability, and mechanical limitations (i.e. softness) to be tuned using the concentration of the two polymers.

Many suitable combinations of partially miscible acrylic resins may be used in the present ink receptive layer 102. A first acrylic polymer may be associated with the hardness of the resulting ink receptive layer 102. In other words, the hardness of the ink receptive substrate may increase with increasing concentration of the first acrylic polymer. A second acrylic polymer may be associated with the flexibility of the resulting ink receptive layer 102. Consequently, the flexibility of the ink receptive substrate may increase with increasing concentration of the second acrylic polymer. The ratio of the first acrylic polymer to the second acrylic polymer may be adjusted depending on the printing application. The mass ratio of the first acrylic polymer to the second acrylic polymer may be between 1:3 and 1:9.

The use of the second acrylic polymer allows for a flexible resin system which can facilitate an increased water capacity by allowing the system to expand and contract without cracking and fracturing. Albeit, if the resin system is too soft, it is prone to being easily scratched off. The use of the first acrylic polymer provides a level of hardness which can aid in scratch and abrasion resistance. The weighted average of the glass transition temperatures of the first acrylic polymer and the second acrylic polymer may be between −14 and 42 degrees Celsius, between 5 and 10 degrees Celsius, or specifically about 7 degrees Celsius.

The ink receptive layer 102 may have a thickness between about 0.2 and 3.0 mils, about 0.5 and 2 mils, or about 0.81 and 1.08 mils. The thickness may be adjusted to suit particular applications depending on the suspected environment.

In aspects with both the first and second silica particles and the first and second acrylic resins, the ratio of the filler (silica) to binder (acrylic resins) may be increased or decreased depending on the ink and printing system used, in order to manage variable amounts of liquid ink capacity. The filler to binder ratio may be between about 0.30 and 0.65, between about 0.50 and 0.60, between about 0.55 and 0.60, or specifically about 0.60. The filler usage can be varied depending on the quantity of ink and water deposited onto the surface.

The ink receptive layer 102 may further comprise at least one ultraviolet light absorber. Unlike prior systems, which utilize liquid ultraviolet light absorbers, the absorber of the present disclosure may be in the form of a solid. The incorporation of a solid ultraviolet absorber provides improved UV protection at the interface between the ink and coating because it can be incorporated throughout the entire formula without being absorbed into the pores of the silica. The solid ultraviolet absorber may be utilized in the range between 1% and 8% of the total dry formula mass of the ink receptive layer 102. In one form, the solid ultraviolet absorber may be about 5.5% of the total dry formula mass.

Figure 2:
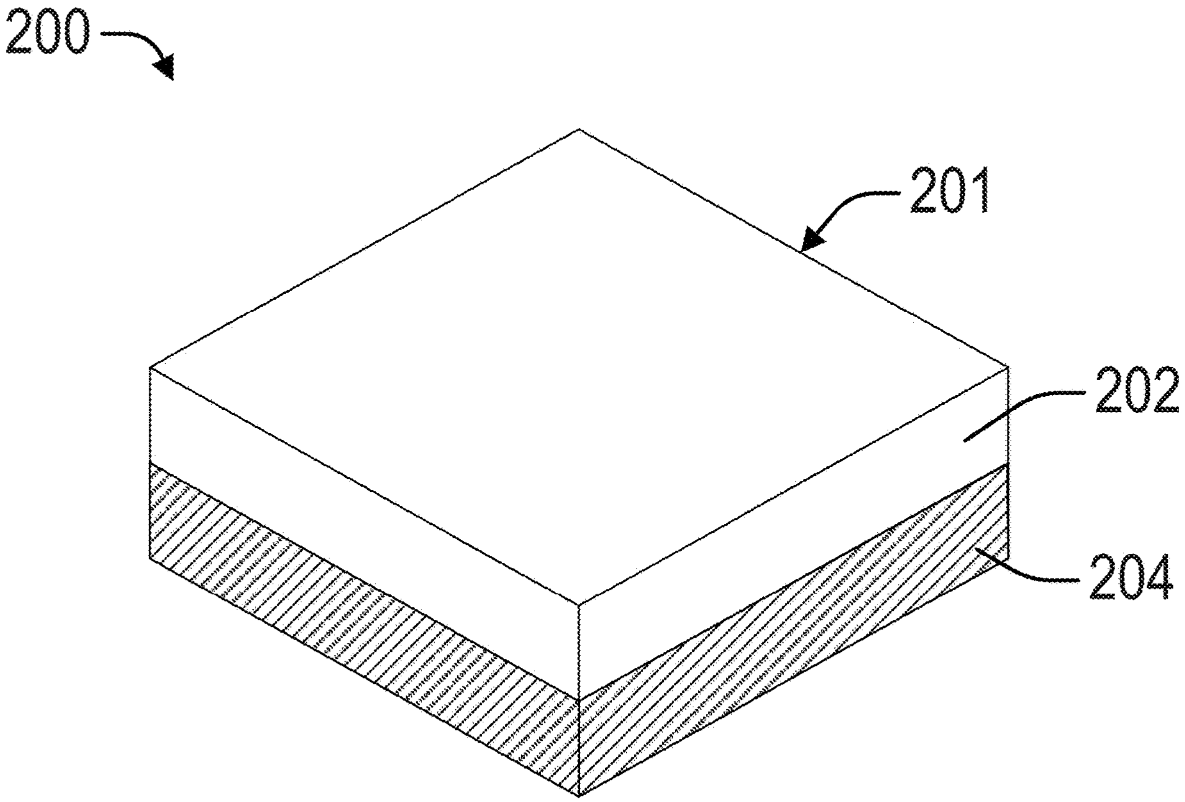
FIG. 2 is a perspective view of a portion of an ink receptive substrate, in accordance with another aspect of the present disclosure.

FIG. 2 depicts an ink receptive substrate 200 according to another aspect of the present disclosure. In the illustrated embodiment, the ink receptive substrate 200 includes an ink receptive layer 202 configured to receive at least one inkjet ink and having an ink receptive top surface 201. The ink receptive layer 202 can have any of the compositional properties as the ink receptive layer 102 discussed herein. The ink receptive substrate further comprises a base layer 204 configured to support the ink receptive layer.

A portion of the base layer 204 may be positioned to contact at least a portion of the ink receptive layer 202. In this manner, the base layer 204 can support and connect to the ink receptive layer 202. In one form, the base layer comprises a nonwoven fabric. A suitable nonwoven fabric may be Tyvek Brillion 4173D. The use of a nonwoven substrate is believed to be novel, and allows mechanical bonds to form between the substrate fibers and the above layer or layers. Thus, the nonwoven substrate allows for contacting layers to form entanglements with the material, providing a much stronger mechanical bond than a traditional polymer film base layer. However, in some aspects, incorporating the protective inkjet receptive layer 202 on a polymeric base layer may be viable for samples that have reduced performance criteria.

Figure 3:
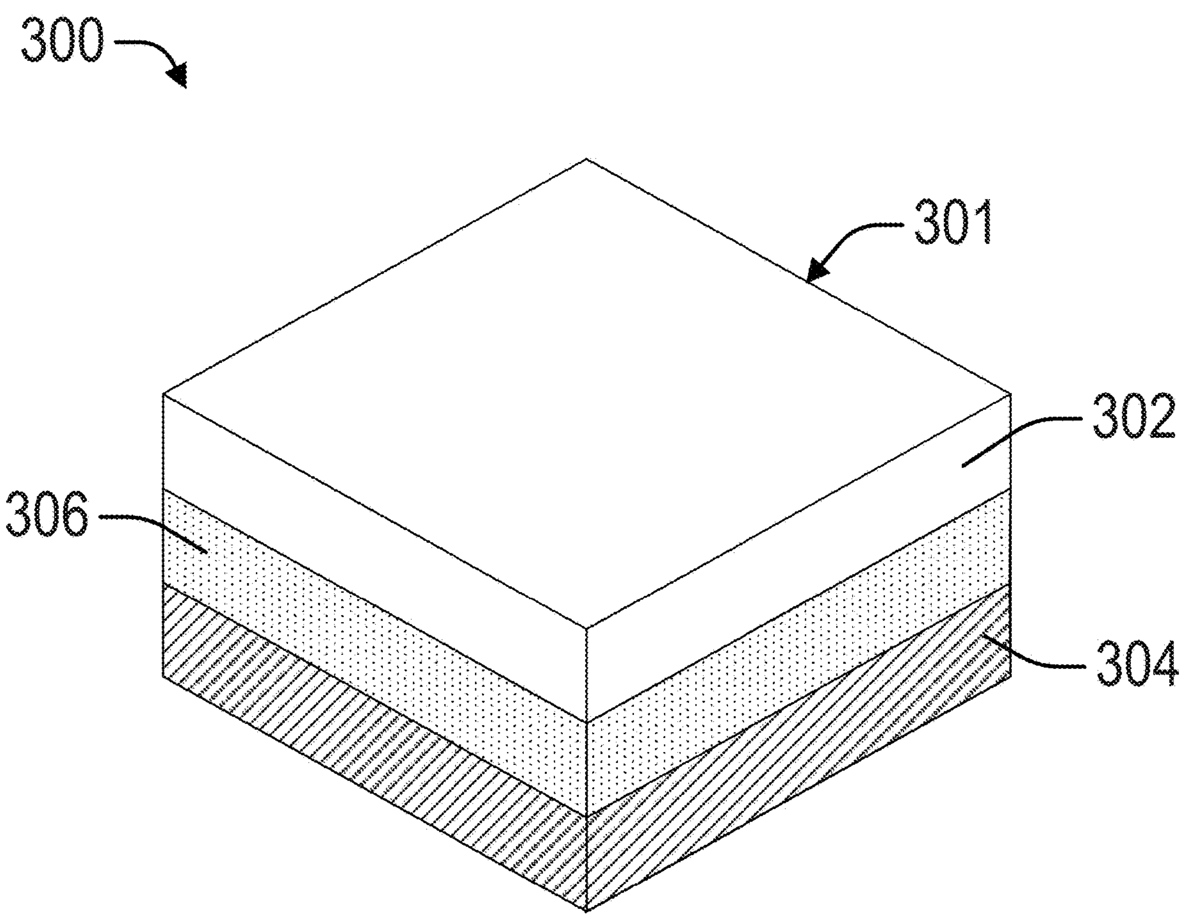
FIG. 3 is a perspective view of a portion of an ink receptive substrate, in accordance with one aspect of the present disclosure.

FIG. 3 depicts an ink receptive substrate 300 according to one aspect of the present disclosure. In the illustrated embodiment, the ink receptive substrate 300 includes a base layer 304 and an ink receptive layer 302 configured to receive at least one inkjet ink and having an ink receptive top surface 301. The ink receptive layer 302 can have any of the compositional properties as the ink receptive layers 102, 202 discussed herein. Similarly, the base layer 302 can have any of the compositional properties as the base layer 202 of FIG. 2. The ink receptive substrate further comprises a high water capacity layer 306 configured to reduce water accumulation in the ink receptive layer 302, wherein at least a portion of the high water capacity layer 306 is interposed between the ink receptive layer 302 and the base layer 304. In this manner, the high water capacity layer may connect to both the ink receptive layer 302 and the base layer 304.

By drawing water away from the ink receptive layer, the high water capacity layer 306 allows for increased quantities of ink to be deposited on the top surface 301 with reduced lateral print bleed occurring. Many high water capacity layer compositions have been used in prior systems. However, previous high water capacity layers have been combined with polymeric base layers, rather than nonwovens. In forms of the ink receptive substrate with a reduced or no high capacity water layer, concentrated inks may be used for better printing results.

In another aspect, a method of making the ink receptive substrate described herein is provided. The method can comprise forming the ink receptive coating. The ink receptive coating may be formed on the base layer or the high water capacity layer. The ink receptive layer may be formed from a solvent-based technique.

EXAMPLES

The following examples set forth, in detail, ways in which the ink receptive substrate 300 may be created, used, and implemented, and assist to enable one of skill in the art to more readily understand the principles thereof. The following examples are presented by way of illustration and are not meant to be limiting in any way.

Silica Selection

In the conducted experiments, commercially available silicas Syloid® C812 and Lo-Vel® 275 were chosen as the absorptive silica component and the packing silica component respectively.

Syloid® C812 is non-coated, non-treated 11.3-12.7 (12) micron silica designed for matting efficiency by reducing the gloss of a coating. The mechanism for the matting of a coating is to incorporate the silica into a liquid coating, and upon drying, the silica will create a micro-roughening of the surface. This micro-roughness induces topography of the topcoat allowing for the ink to be deposited in pools, creating regions of high and low ink deposition which can concentrate the ink at the surface.

The pore volume is also a noteworthy feature of the Syloid® C812 silica, because silica particles act as tiny sponges, absorbing water into their pores. The porosity of this highly porous material is expressed by pore volume, which indicates the amount of internal voids in the silica particle. Without being bound by theory, the higher the pore volume of the silica, the higher the overall water capacity per silica particle.

The particle size selected for the experiment, utilized the Syloid® C812 which is a 12-micron silica. Without being bound by theory, it is contemplated that the larger the average particle size, the higher the matting efficiency because the larger particles create the highest degree of surface micro-roughening. Therefore, the larger the particle, the larger the surface area, pore volume, and surface roughness resulting in increased water capacity and a greater number of peaks and valleys for the ink to be deposited on the surface.

The Lo-Vel® 275 is a non-coated 8-micron silica specifically engineered to have higher packing efficiency. The packing efficiency of the Lo-Vel® 275 can be measured by its surface area. Lo-Vel® 275 has a measured surface area of 175 $m^2$/gm, while Syloid® C812 has a measured surface area of 305 $m^2$/gm. Thus, the Lo-Vel® 275 has a surface area that is 130 $m^2$/gm less than that of Syloid® C812, a 43% reduction. This reduction in surface area allows for the Lo-Vel® 275 to tightly pack around other larger particles, specifically the Syloid® C812.

In a single silica system which utilizes a highly absorptive silica such as Syloid® C812, the silica creates channels which the water can travel unhindered, and carry some of the ink solids through the coating, resulting in lower optical density. In a single silica system that utilizes a high packing efficiency silica such as Lo-Vel® 275, the silica creates a tightly packed system which prevents the water and ink from freely traveling through the pores resulting in an increased optical density. As an illustration of these limitations, see FIGS. 4A and 4B.

In contrast, the present experiment used a blend of silica (see FIG. 4C for an illustration) which provided an increased packing efficiency around a highly absorptive silica creating a type of mechanical sieve which will filter the water towards the bottom while depositing the solids (i.e. resin and pigment) towards the surface.

Resin Selection

In the conducted experiments, commercially available resins Paraloid™ B66 and Aroset™ 303B were chosen. This unique formulation is differentiating in multiple ways when compared to prior systems. This resin blend utilizes two grades of solvent based acrylic resins which are partially miscible and serve to benefit multiple performance attributes.

Figure 5:
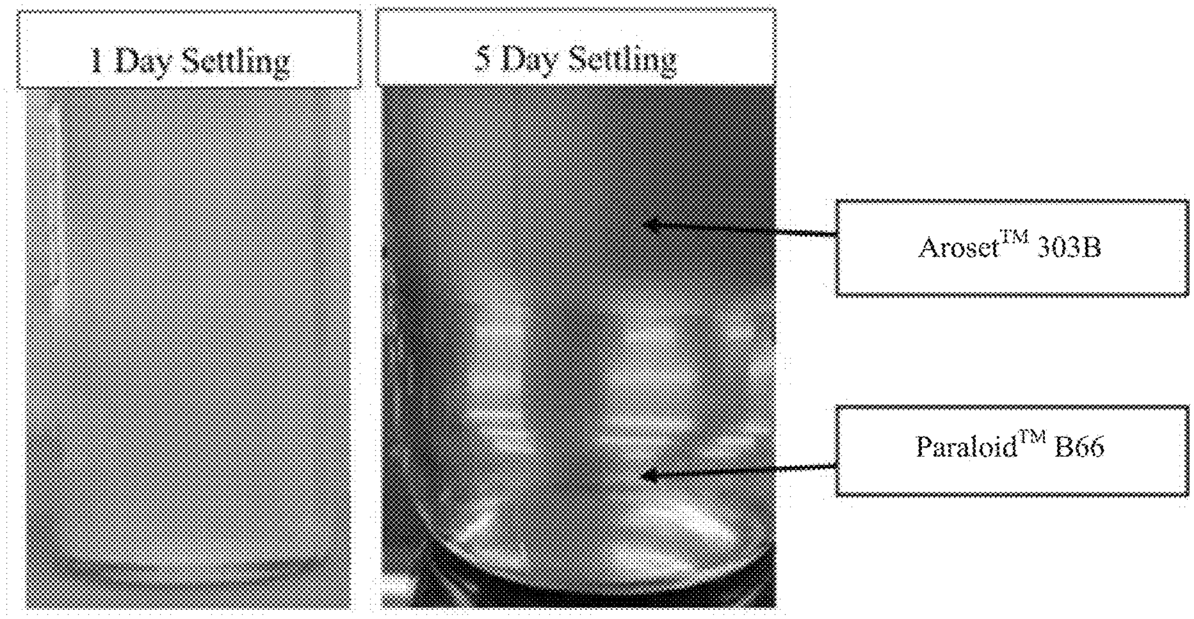
FIG. 5 depicts experimental images of a Paraloid™ B66 (a thermoplastic acrylic resin available from The Dow Chemical Company of Midland, MI) and Aroset™ 303B (an acrylic polymer available from Ashland Global Specialty Chemicals, Inc. of Covington, OH) when dispersed in a 50/50 blend of MEK and Toluene over time.

Paraloid™ B66 and Aroset™ 303B when dispersed in a 50/50 blend of MEK and Toluene exhibit a stable and homogenous solution over at least 3 days. After a period between 3-5 days, the solution of Paraloid™ B66 and Aroset™ 303B phase separates leaving a layer of the Aroset™ 303B on top and Paraloid™ B66 on the bottom, as seen in FIG. 5.

This separation indicates that, although Paraloid™ B66 (acrylic) and Aroset™ 303B (acrylic) are similar in chemistry, they are not fully and completely miscible over long periods of time. Without being bound by theory, this separation is likely a function of the molecular weight and functionality differences between the Paraloid™ B66 and Aroset™ 303B. Under agitation, this mixture does not phase separate.

The miscibility of these components were tested using DMA where the Aroset™ 303B, Paraloid™ B66, and a blend thereof were not found to merge into a single broader peak but rather remain as multiple, separate peaks. This separation of peaks in a blend of Aroset™ 303B and Paraloid™ B66 indicates that each polymer is capable of contributing individual physical properties. Consequently, the substrates formed by the polymers Aroset™ 303B and Paraloid™ B66 can be engineered to exhibit specific physical properties.

The use of Aroset™ 303B allows for a flexible resin system that can facilitate an increased water capacity by allowing the system to expand and contract without cracking and fracturing. Albeit, if the resin system is too soft it is prone to being easily scratched off. The use of Paraloid™ B66 provides a level of hardness that can aid in scratch and abrasion resistance.

Performance

The performance of various samples were studied to assess properties of interest, such as absorptive capacity and print quality, the optical density, the outdoor durability, and the scratch and mar resistance. These experimental results are discussed below.

Absorptive Capacity and Print Quality

The use of Aroset™ 303B allows for a flexible resin system that will facilitate an increased water capacity by allowing the system to expand and contract without cracking and fracturing. Albeit, if the resin system is too soft it is prone to poor scratch resistance. The use of Paraloid™ B66 provides a level of hardness which aids in scratch and abrasion resistance. Therefore, modifications in the resin ratios while maintaining aspects such as filler to binder ratio and filler composition levels will demonstrate differences in absorptive capacities made visible by print quality.

Samples were printed off on a BradyJet J5000 industrial inkjet label printer using J50 ink on the highest print quality settings. The primary formulation variable modified in this trial were the resin ratio between the Aroset™ 303B and Paraloid™ B66 resins. Formulations incorporating primarily the Aroset™ 303B demonstrate increase print quality of reverse printed images. Formulations incorporating increased quantities of Paraloid™ B66 demonstrate increased tendencies for lateral bleeding.

Figure 6:
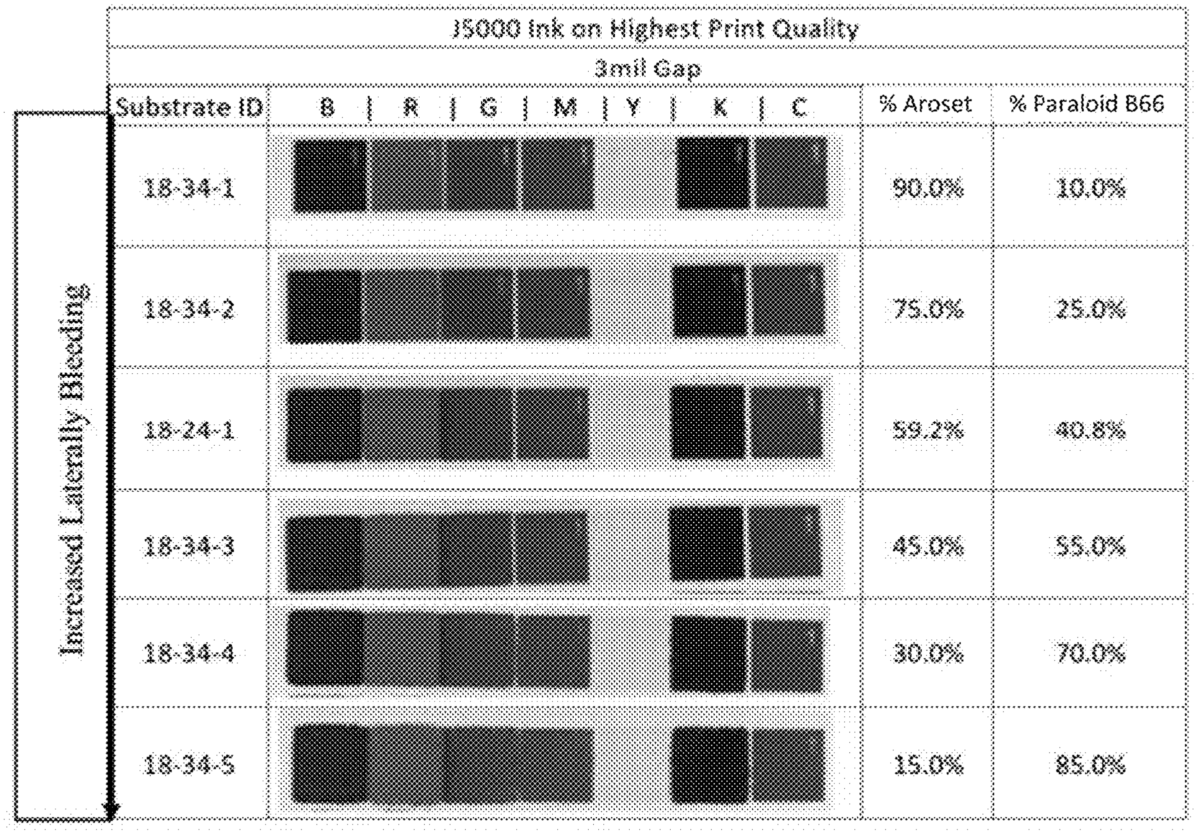
FIG. 6 depicts experimental images of the print quality and lateral bleed qualities of various resin ratios between Aroset™ 303B and Paraloid™ B66. The print quality is depicted as a function of resin components.

FIG. 6 demonstrates the print quality and lateral bleed qualities of various resin ratios between Aroset™ 303B and Paraloid™ B66. Furthermore, FIG. 6 depicts the print quality as a function of resin components. As the resin network comprises of a hard glassy resin (Paraloid™ B66), the harder resin matrix limits expansion (i.e., the amount of water absorption) promoting lateral bleeding at the surface (denoted by the arrow on the left side of FIG. 6) because of the low rate of water penetration.

Induced Surface Roughness

Figure 7:
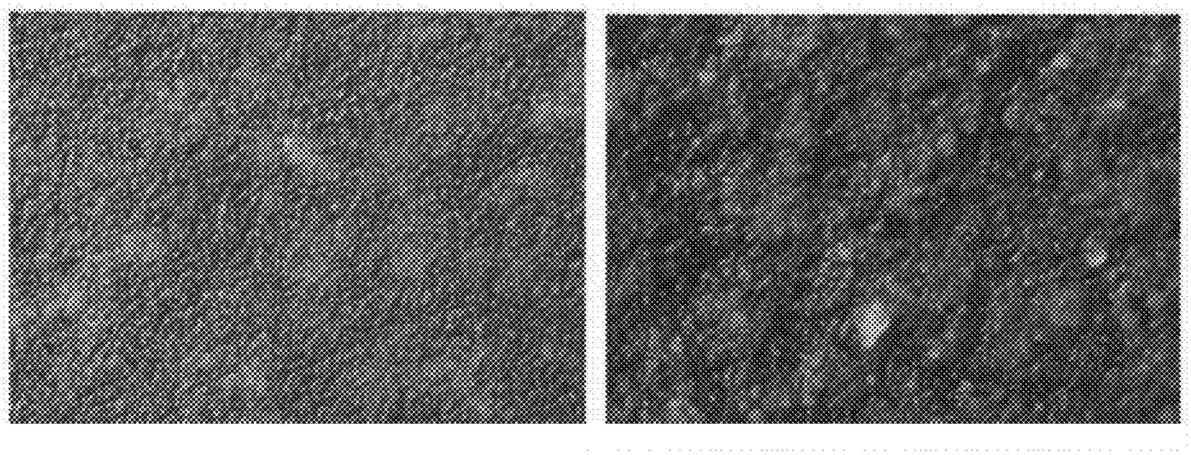
FIG. 7 depicts magnified experimental images of a competitive inkjet receptive coating (right) and an experimental substrate formed using the teachings of the present disclosure (left). The printing and lighting conditions were the same for each photograph.

At 20× magnification, FIG. 7 illustrates a competitive inkjet receptive coating (right) and how a composite black ink is printed onto the surface. An experimental substrate is also illustrated (left), and was printed with a composite black ink under the same conditions and photographed under the same lighting.

Optical Density

The optical density was studied for the experimental substrates with varying resin ratios. Through the induced surface topography and the utilization of the two resin system, benefits can be observed through printed optical density.

Figure 8:
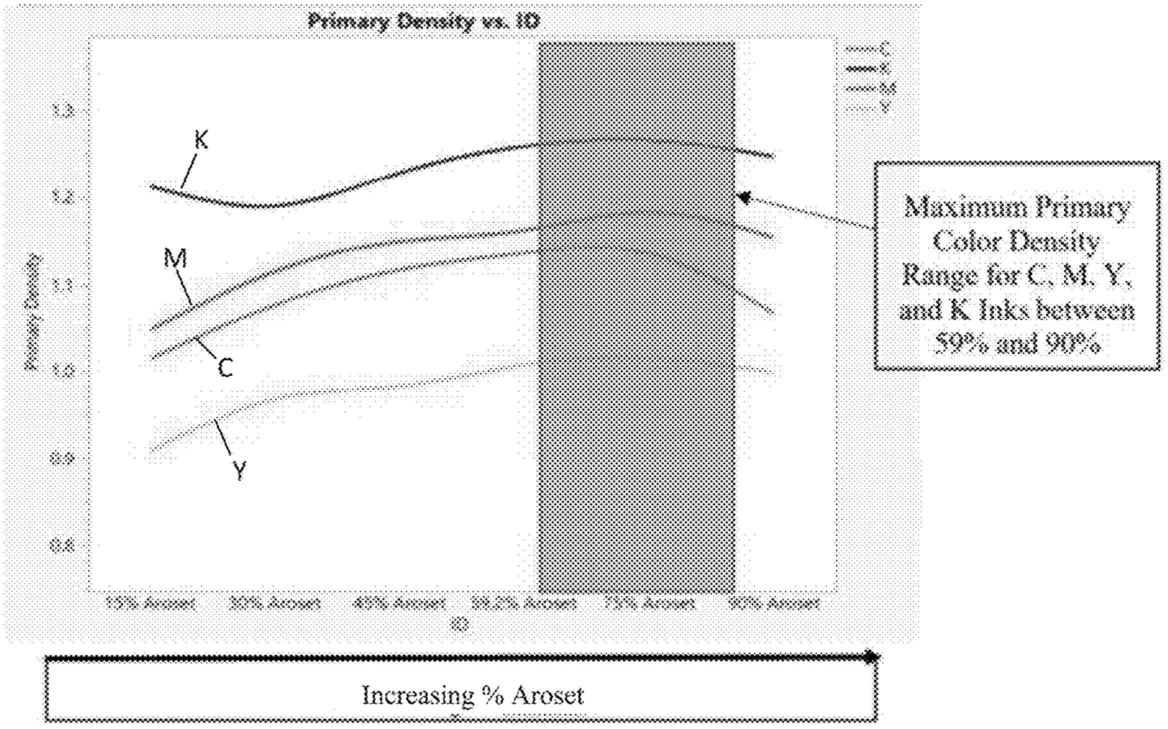
FIG. 8 depicts an experimental graph of C, M, Y, and K optical density measurements at various Aroset™ 303B and Paraloid™ B66 concentrations with the lines being arranged on the graph in top to bottom order of K, M, C, and Y.

As shown in FIG. 8, formulations utilizing primarily Paraloid™ B66 demonstrate decreased optical density across C, M, Y, and K measurements. As the amount of Aroset™ 303B increases in the formulations, the optical density increases until it reaches a maximum optical density between 59% and 90% Aroset™ 303B.

As the Aroset™ 303B loading exceeds 75%-90% the optical density for Cyan sharply declines and a slight decline for Magenta, Yellow, and Black optical density is observed.

Outdoor Durability Testing

Incorporation of a UV absorber has been used in prior systems to improve UV stability and ultimately outdoor durability. However, previous constructions have utilized liquid UV absorbers. The use of any liquid UV absorber has adverse effects on the performance of an inkjet receptive coating in multiple different aspects. A liquid UV absorber will be absorbed into the pores of the highly absorptive silica filler. This will decrease the overall absorptive capacity of the coating while providing no UV stability at the coating/ink interface.

The present experiment incorporated a solid UV absorber which provides UV protection at the interface between the ink and coating as it is incorporated throughout the entire formula and will not be absorbed into the pores of the silica.

Figure 9:
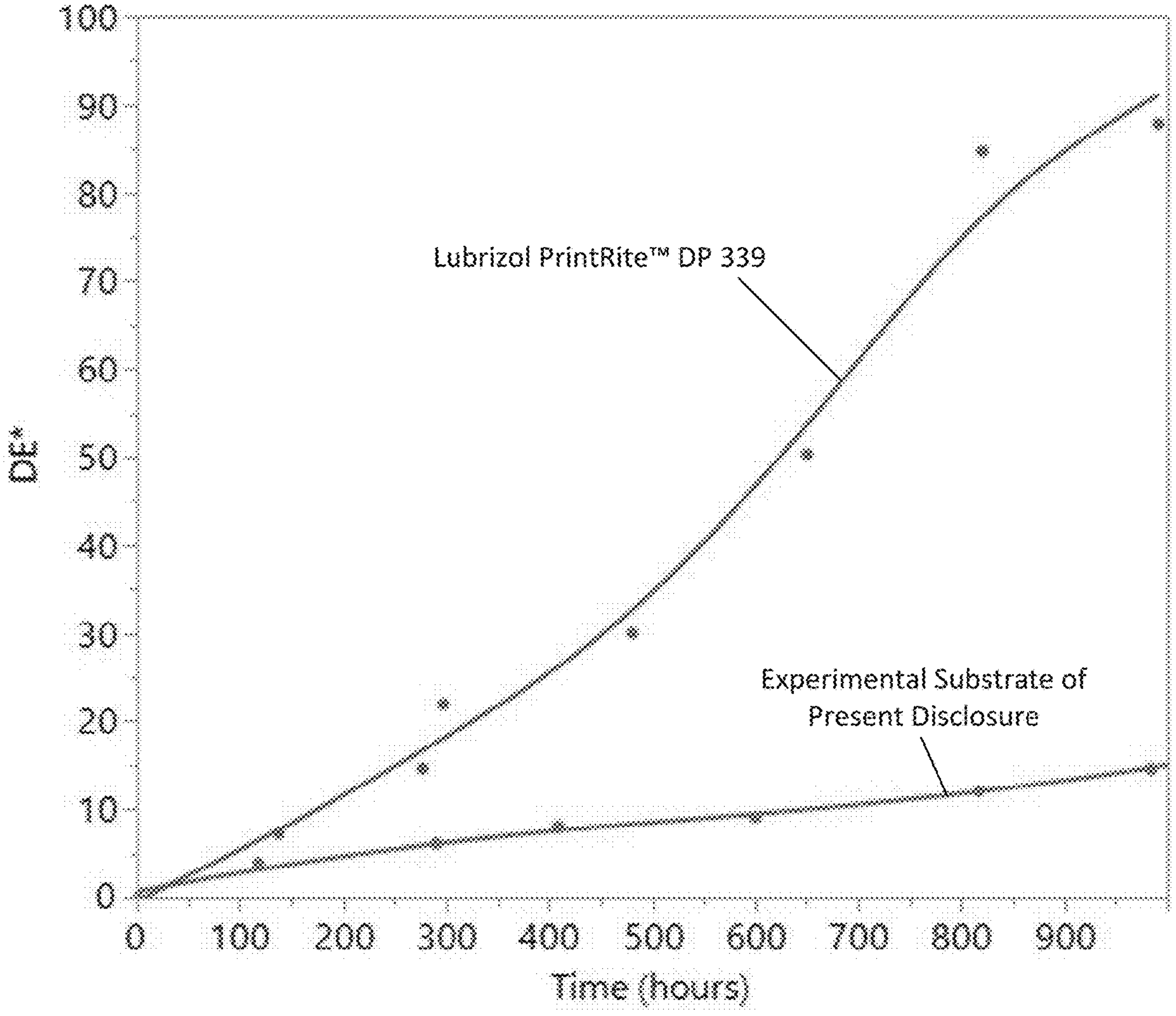
FIG. 9 depicts an experimental graph of a ultraviolet light stability of a yellow inkjet ink printed onto a commercial aqueous inkjet receptive coating (Lubrizol PrintRite™ DP 339 in Red, top line and available from Lubrizol of Wickliffe, OH) and an experimental substrate formed using the teachings of the present disclosure (Green, bottom line) after ~1100 hours in accelerated weathering under ASTM G155-2.

FIG. 9 illustrates an experimental graph of a ultraviolet light stability of a yellow inkjet ink printed onto a commercial aqueous inkjet receptive coating (Lubrizol PrintRite™ DP 339 in Red, top line) and an experimental substrate formed using the teachings of the present disclosure (Green, bottom line) after ~1100 hours in accelerated weathering under ASTM G155-2.

Scratch and Mar Resistance Testing

Operating at either end of the spectrum where the resin is primarily Paraloid™ B66 or Aroset™ 303B resulted in two observable failure modes.

Figure 10A:
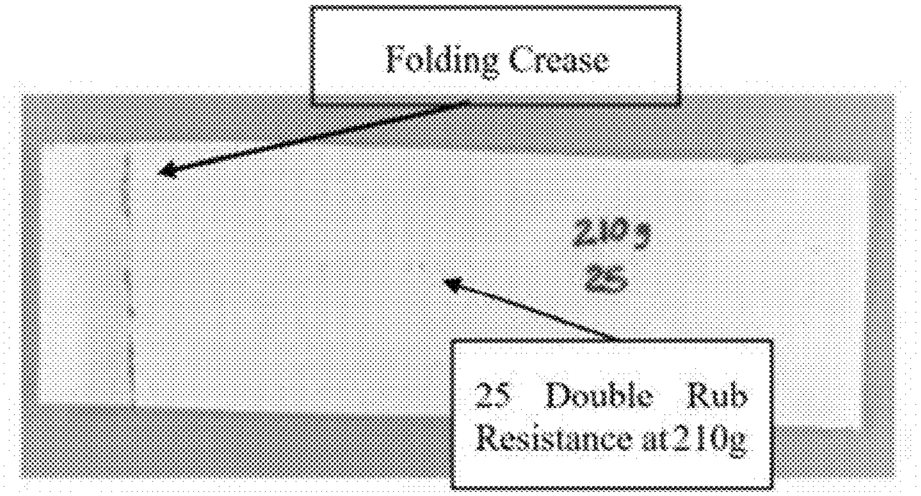
FIG. 10A depicts experimental images of the rub and fold resistance for Paraloid™ B66 as the sole resin.

As the resin blend is pushed primarily towards the Paraloid™ B66 spectrum the coating becomes hard and brittle, resulting in the coating cracking and fracturing when flexed. FIG. 10A depicts a sample of the Paraloid™ B66, as the sole resin, surviving 25 double rubs with a 210 g weight with no coating removal. The same sample is then folded onto itself and the coating can be seen to crack off.

Figure 10B:
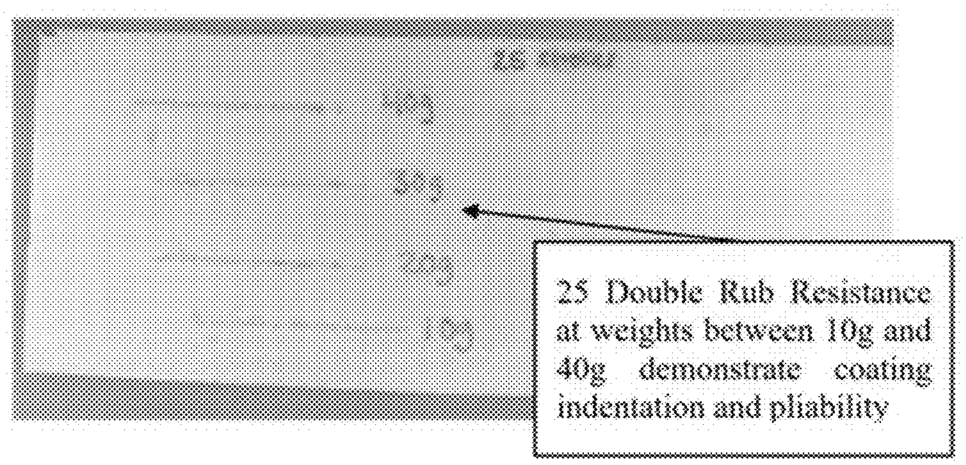
FIG. 10B depicts experimental images of the rub resistance for Aroset™ 303B as the sole resin.

As the resin blend is pushed primarily towards the Aroset™ 303B spectrum the coating becomes soft and easily indented and removed. FIG. 10B is a sample of the Aroset™ 303B as the sole resin, and unable to withstand 25 double rubs with a 10 g weight without the coating being indented and removed.

Figure 10C:
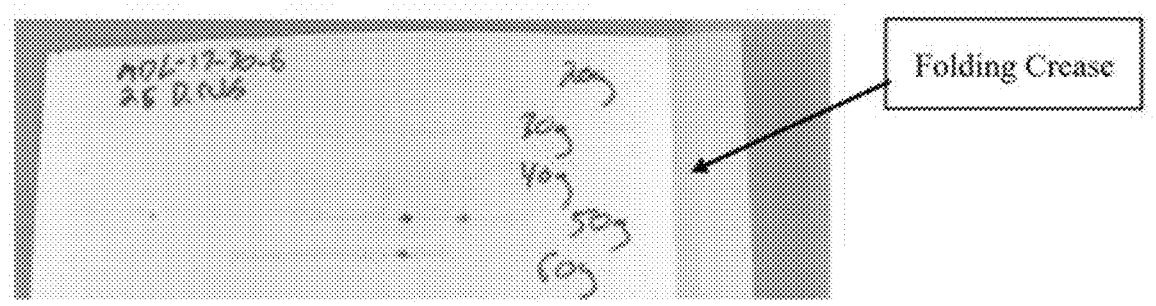
FIG. 10C depicts experimental images of the rub and fold resistance for a resin blend of Paraloid™ B66 and Aroset™ 303.

A blend of resins provided a balance where the coating is more resistant to scratch resistance than the Aroset™ 303B construction, and does not fracture when folded onto itself as seen in Paraloid™ B66 construction. FIG. 10C demonstrates the increased double rub and fold resistance in a resin blend.

Silica Contribution to Scratch and Mar Resistance

Figure 11A:
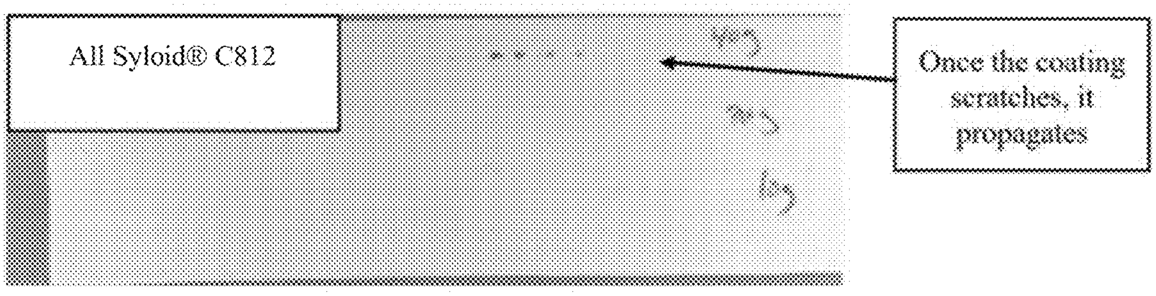
FIG. 11A depicts experimental images of the rub resistance for Syloid® C812 (an amorphous synthetic silica available from W.R. Grace & Company of Columbia, MD) as the sole silica component.
Figure 11B:
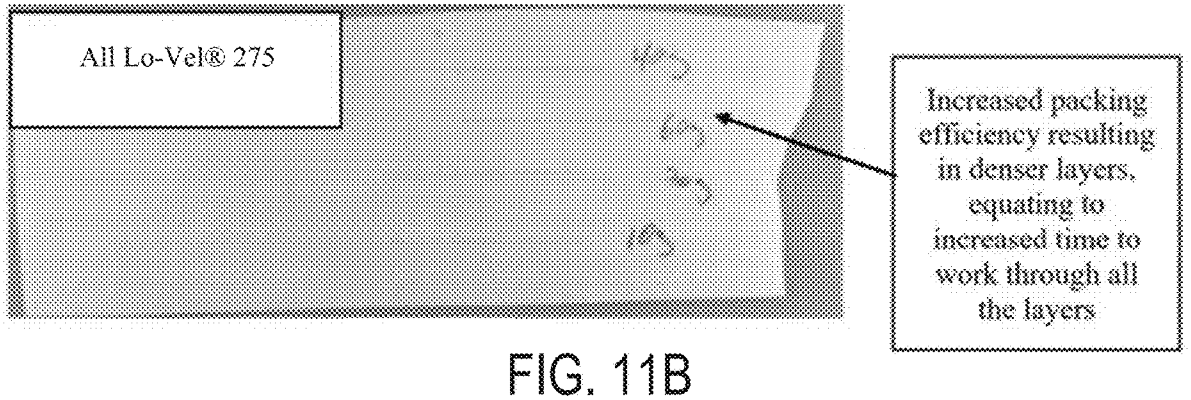
FIG. 11B depicts experimental images of the rub resistance for Lo-Vel® 275 (a synthetic amorphous precipitated silica available from PPG Industries, Inc. of Pittsburgh, PA) as the sole silica component.

As shown in FIG. 11A, formulations incorporating strictly the Syloid® C812 are more susceptible to scratch off due to lower packing efficiency, when compared to formulations incorporating strictly the Lo-Vel® 275 as in FIG. 11B. The images in FIGS. 11A and 11B demonstrate 25 rubs of a 10 g-60 g weight on a sample with all Syloid® C812 and all Lo-Vel® 275 as the filler. All other conditions of the formulation were held constant. The formula with all Lo-Vel® 275 was found to demonstrate increased rub resistance.

The blend of silicas used in this experiment was found to provide a balance where the coating utilizes the Syloid® C812 for its surface topography and absorptive capacity and the Lo-Vel® 275 for its high packing efficiency while balancing the water capacity and rate of absorption.

Figure 11C:
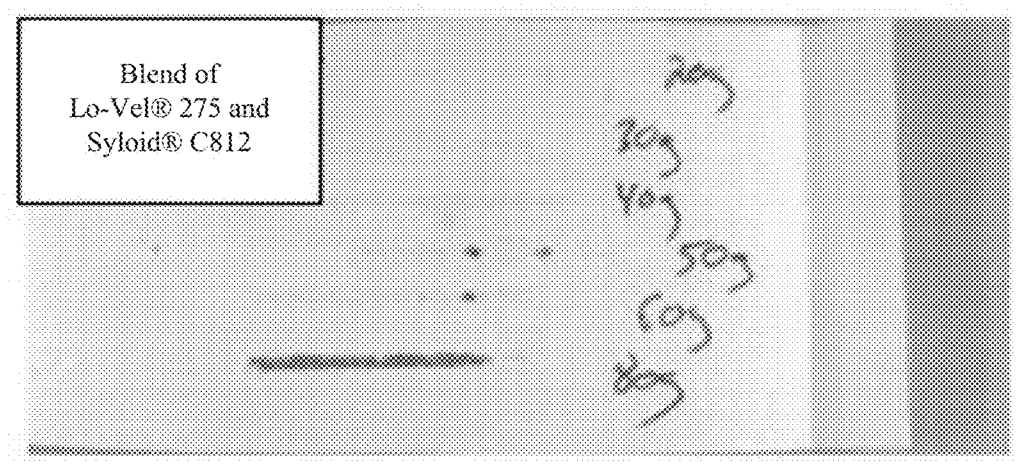
FIG. 11C depicts experimental images of the rub resistance for a blend of Syloid® C812 and Lo-Vel® 275.

FIG. 11C illustrates a sample with a blend of silica which demonstrates the opportunity to selectively tune the scratch resistance utilizing the silica.

Resin Selective Tuning for Chemical Resistance

The use of Aroset™ 303B allows for a flexible resin system that will facilitate an increased water capacity by allowing the substrate to expand and contract without cracking and fracturing. Albeit, if the resin system is too soft it is prone to being easily scratched off. The use of Paraloid™ B66 provides a level of hardness that aids in scratch and abrasion resistance.

Therefore, modifications in the resin ratios while maintaining aspects such as filler to binder ratio and filler composition levels will demonstrate differences in chemical resistance made visible by chemical rub testing.

Formulations used in the experiment are highlighted in Table 1 below. The only formulation variable modified was the resin ratio between the Aroset™ 303B and Paraloid™ B66 resins.

TABLE 1

| Formulations for Chemical Resistance Testing | | | | | |
|---|---|---|---|---|---|
| ID | % Aroset™ 303B | % Paraloid™ B66 | % solids | Water Absorption (mg/100 mL) | F:B ratio |
| 18-34-1 | 90.0% | 10.0% | 27.20% | 178.6 | 0.598 |
| 18-34-2 | 75.0% | 25.0% | 27.20% | 178.6 | 0.598 |
| 18-24-1 | 59.2% | 40.8% | 27.20% | 178.6 | 0.598 |
| 18-34-3 | 45.0% | 55.0% | 27.20% | 178.6 | 0.598 |
| 18-34-4 | 30.0% | 70.0% | 27.20% | 178.6 | 0.598 |
| 18-34-5 | 15.0% | 85.0% | 27.20% | 178.6 | 0.598 |

Figure 12:
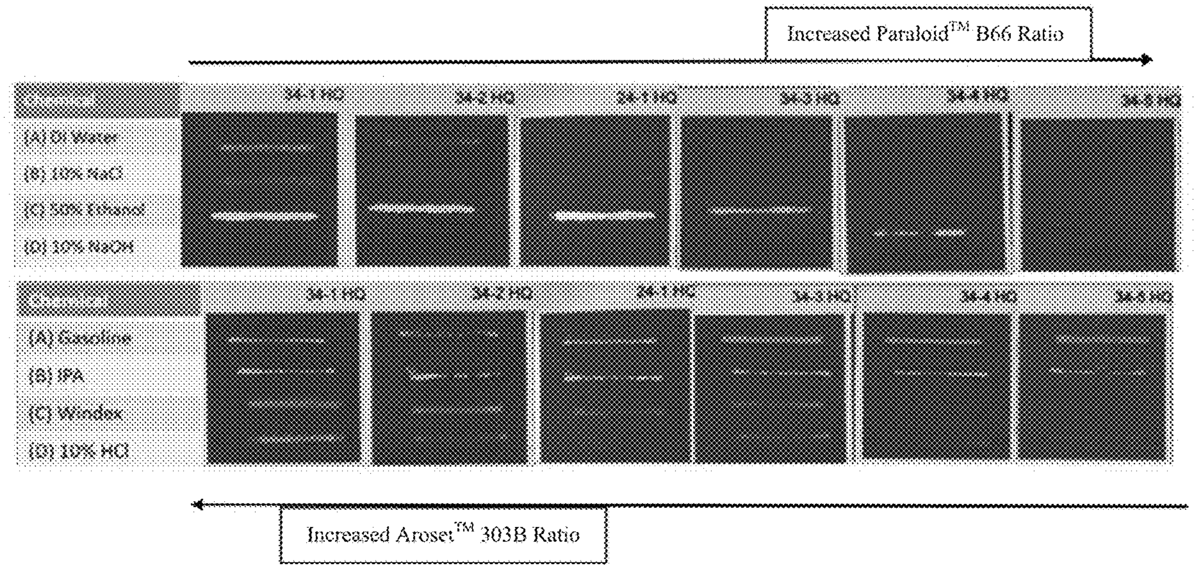
FIG. 12 depicts experimental images of the chemical rub resistance of various resin ratios of Aroset™ 303B and Paraloid™ B66.

Fifty chemical double rubs were conducted using a 10 g weight and the following solvents: DI Water, 10% NaCl, 50% Ethanol, 10% NaOH, Gasoline, IPA, Windex, 10% HCl. FIG. 12 illustrates the chemical rub resistance of various resin ratios between Aroset™ 303B and Paraloid™ B66.

Resin Selective Tuning for Abrasion Resistance

The use of Aroset™ 303B allows for a flexible resin system that will facilitate an increased water capacity by allowing the system to expand and contract without cracking and fracturing. Albeit, if the resin system is too soft it is prone to being easily scratched off. The use of Paraloid™ B66 provides a level of hardness that aids in scratch and abrasion resistance.

Therefore, modifications in the resin ratios while maintaining aspects such as filler to binder ratio and filler composition levels will demonstrate differences in abrasion resistance made visible through Taber abrasion. The same samples from Table 1 were used in the abrasion tests.

Samples were tested using a Taber abrader with CS10 wheels and 250 g of weight after 0 cycles, 100 cycles, and 200 cycles.

Figure 13:
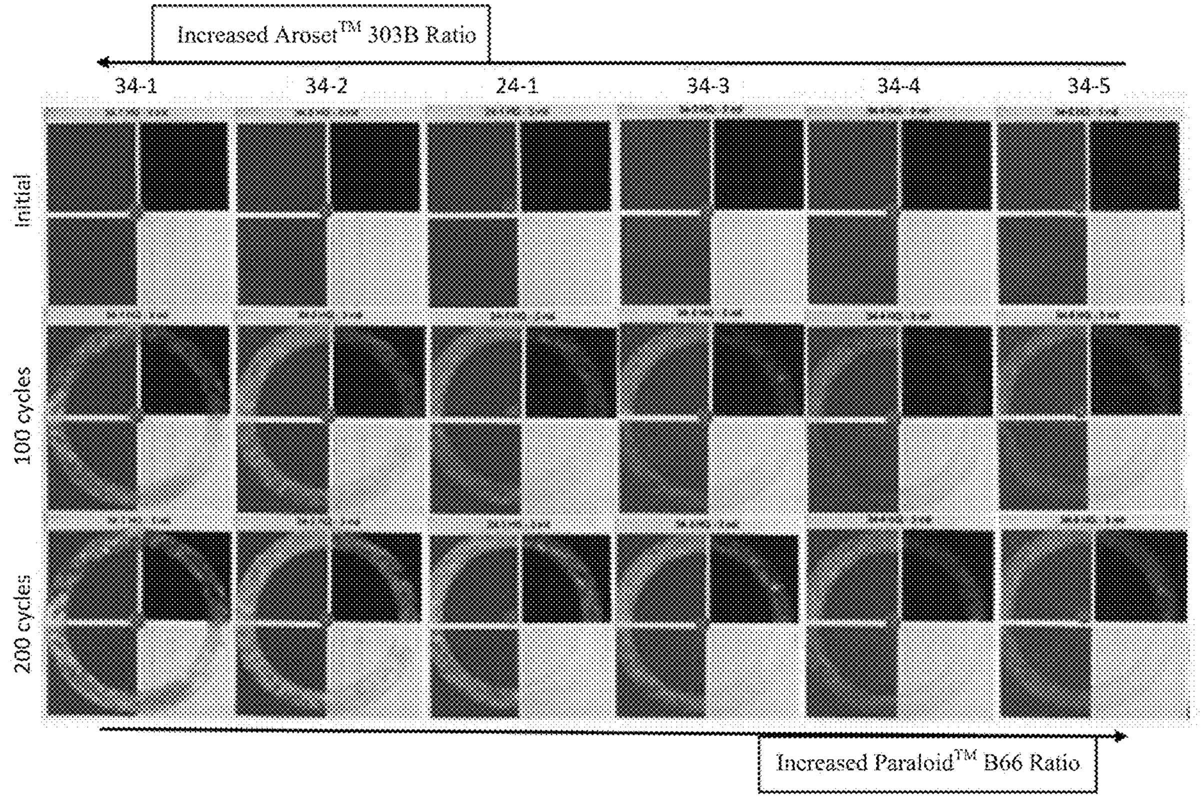
FIG. 13 depicts experimental images of the abrasion resistance of various resin ratios between Aroset™ 303B and Paraloid™ B66 after 0 cycles (top row), 100 cycles (middle row), and 200 cycles (bottom row).

FIG. 13 illustrates the abrasion resistance of various resin ratios between Aroset™ 303B and Paraloid™ B66 after 0 cycles, 100 cycles, and 200 cycles. It can be seen that the ratios including greater amounts of Paraloid™ B66 to Aroset™ 303B had less visible abrasion.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

Various features and advantages of the invention are set forth in the following claims.

We claim:

1. An ink receptive substrate comprising:

an ink receptive layer configured to receive at least one inkjet ink, the ink receptive layer comprising:

a plurality of first silica particles in which the first silica particles have an average particle diameter of from 11 to 14 micrometers; and a plurality of second silica particles in which the second silica particles have an average particle diameter of from 6 to 10 micrometers, wherein the average particle diameter of the first silica particles is different than the average particle diameter of the second silica particles.

2. The ink receptive substrate of claim 1, wherein the average particle diameter of the first silica particles differs from that of the second silica particles by at least 2 micrometers.

3. The ink receptive substrate of claim 2, wherein the average particle diameter of the first silica particles differs from that of the second silica particles by at least 4 micrometers.

4. The ink receptive substrate of claim 1, wherein the average surface area of the first silica particles is at least 30% more than the average surface area of the second silica particles.

5. The ink receptive substrate of claim 1, wherein the mass ratio of the first silica particles to the second silica particles in the ink receptive substrate is between about 9:1 and 1:9.

6. The ink receptive substrate of claim 1, wherein the ink receptive layer further comprises at least one ultraviolet light absorber.

7. The ink receptive substrate of claim 6, wherein the at least one ultraviolet light absorber is in the form of a solid.

8. The ink receptive substrate of claim 1 further comprising a base layer configured to support the ink receptive layer.

9. The ink receptive substrate of claim 8, wherein the base layer comprises a nonwoven fabric.

10. The ink receptive substrate of claim 8, wherein a portion of the base layer is positioned to contact at least a portion of the ink receptive layer.

11. The ink receptive substrate of claim 8 further comprising a high water capacity layer configured to reduce water accumulation in the ink receptive layer, wherein at least a portion of the high water capacity layer is interposed between the ink receptive layer and the base layer.

12. The ink receptive substrate of claim 1, wherein the ink receptive layer has a thickness between 0.2 and 3.0 mils.

13. An ink receptive substrate comprising:

an ink receptive layer configured to receive at least one inkjet ink, the ink receptive layer comprising:

a first acrylic polymer; and a second acrylic polymer, wherein the first acrylic polymer and second acrylic polymer are partially miscible and wherein the mass ratio of the first acrylic polymer to the second acrylic polymer is between 1:3 and 1:9; and a base layer configured to support the ink receptive layer, wherein the base layer comprises a nonwoven fabric.

14. The ink receptive substrate of claim 13, wherein the hardness of the ink receptive substrate increases with increasing concentration of the first acrylic polymer.

15. The ink receptive substrate of claim 14, wherein the flexibility of the ink receptive substrate increases with increasing concentration of the second acrylic polymer.

16. The ink receptive substrate of claim 13, wherein the weighted average of the glass transition temperatures of the first acrylic polymer and the second acrylic polymer is between −14 and 42 degrees Celsius.

17. The ink receptive substrate of claim 16, wherein the weighted average of the glass transition temperatures of the first acrylic polymer and the second acrylic polymer is between 5 and 10 degrees Celsius.

18. The ink receptive substrate of claim 13, wherein the ink receptive layer further comprises at least one ultraviolet light absorber.

19. The ink receptive substrate of claim 18, wherein the at least one ultraviolet light absorber is in the form of a solid.

20. The ink receptive substrate of claim 13, wherein a portion of the base layer is positioned to contact at least a portion of the ink receptive layer.

21. The ink receptive substrate of claim 13 further comprising a high water capacity layer configured to reduce water accumulation in the ink receptive layer, wherein at least a portion of the high water capacity layer is interposed between the ink receptive layer and the base layer.

22. The ink receptive substrate of claim 13, wherein the ink receptive layer has a thickness between 0.2 and 3.0 mils.

* * * * *